(12) United States Patent
Wu

(10) Patent No.: US 12,216,767 B2
(45) Date of Patent: Feb. 4, 2025

(54) METHOD AND SYSTEM FOR INTERCEPTING DIRTY DATA

(71) Applicant: Hangzhou MoreSec Technology Co., Ltd., Hangzhou (CN)

(72) Inventor: Fengjuan Wu, Hangzhou (CN)

(73) Assignee: Hangzhou MoreSec Technology Co., Ltd., Hangzhou (CN)

( * ) Notice: Subject to any disclaimer, the term of this patent is extended or adjusted under 35 U.S.C. 154(b) by 462 days.

(21) Appl. No.: 17/643,903

(22) Filed: Dec. 13, 2021

(65) Prior Publication Data

US 2023/0097449 A1 Mar. 30, 2023

(30) Foreign Application Priority Data

Sep. 30, 2021 (CN) ........................... 202111162185.2

(51) Int. Cl.
*G06F 21/57* (2013.01)
(52) U.S. Cl.
CPC ...... *G06F 21/577* (2013.01); *G06F 2221/033* (2013.01)
(58) Field of Classification Search
CPC ............. G06F 21/577; G06F 2221/033; G06F 21/554; G06F 21/6227; H04L 63/1433; H04L 63/1416
See application file for complete search history.

(56) References Cited

U.S. PATENT DOCUMENTS

| 2012/0117644 A1* | 5/2012 | Soeder | G06F 21/554 726/22 |
| 2017/0272462 A1* | 9/2017 | Kraemer | G06F 21/52 |
| 2018/0330102 A1* | 11/2018 | Siman | G06F 16/2433 |

FOREIGN PATENT DOCUMENTS

CN 111324668 B * 11/2023 ......... G06F 16/2474

\* cited by examiner

*Primary Examiner* — Kevin Bechtel
*Assistant Examiner* — Sayeda Salma Nahar
(74) *Attorney, Agent, or Firm* — Schwegman Lundberg & Woessner, P.A.

(57) ABSTRACT

A method and a system for intercepting dirty data is disclosed, the method includes: starting a vulnerability detection task and loading an application and an underlying code for communication between the application and a database; acquiring the underlying code and editing the detection logic code to obtain an underlying detection code; acquiring an original request of an application and initiating a replay request through an active IAST so that the application obtains a data stream in response to the replay request; communicating, by the application, with the database through a network to trigger the underlying detection code to start; examining a type of a structured query language of the data stream according to the underlying detection code; constructing and sending an exception structured query language to the database; and returning, by the database, error information to the application and stopping writing the data stream into the database.

3 Claims, 1 Drawing Sheet

METHOD AND SYSTEM FOR INTERCEPTING DIRTY DATA

CROSS-REFERENCE TO RELATED APPLICATIONS

This Non-provisional application claims priority under 35 U.S.C. § 119(a) to Chinese Patent Application No. 202111162185.2, filed on Sep. 30, 2021, the entire contents of which are hereby incorporated by reference in its entirety.

TECHNICAL FIELD

The disclosure relates to a technical field of computer software security testing, in particular to a method and a system for intercepting dirty data.

BACKGROUND ART

With implementation of Security Development Lifecycle (SDL) and Security Agile Framework (called DevSecOps for short) in enterprises, Interactive application security testing technology (IAST), as one of the top ten technologies in a field of network security evaluation, combines advantages of Dynamic Application Security Testing technology (DAST) and Static Application Security Testing technology (SAST) and presents advantages of a high detection rate and a low false positive rate, which is approved by more and more users and incorporated into processes of SDL, DevSecOps or the like.

There are many implementations for IAST, most representatives of which are active and passive instrumentation modes. Compared with the passive instrumentation mode, the active instrumentation mode constructs vulnerabilities on verification of a replay request based on an original request on a basis of runtime bytecode instrumentation, while most of important data of an application is stored in a database; and when the replay request is processed by the application, it may cause unexpected data to be written into the database, that is, dirty data to be written into the database.

An existing implemented active IAST contaminated data processing scheme is a scheme to identify the replay request based on a socket underlying function and throw an exception. However, this scheme leads to a user request failure if database connection is exhausted, and no proper execution of a type querying structured query language (SQL for short) (the type querying SQL does not cause data contamination, but most of SQL injection vulnerabilities need to execute the type querying SQL), both of above fatal problems put this scheme out of implementation.

SUMMARY

In view of drawbacks in the prior art, the disclosure provides a method and a system for intercepting dirty data, which have advantages of intercepting dirty data from being written into a database, without affecting user requests and proper execution of the type querying structured query language, and breaking through a bottleneck that an application program writes the dirty data into the database when processing replay requests.

In order to solve the above technical problems, the present disclosure provides following technical solutions.

A method for intercepting dirty data includes following steps:
starting a vulnerability detection task of an application program, and loading the application program and an underlying code for communication between the application program and a database at the same time;
acquiring the underlying code, editing a detection logic code, and coding the detection logic code into the underlying code to obtain an underlying detection code;
acquiring an original request of the application program, and initiating a replay request with active IAST so that the application program responds to the replay request;
acquiring a data stream in responding to the replay request by the application program so that the application program carries the data stream and performs network communication with a database, and triggering the underlying detection code to start an execution program;
detecting whether a type of a structured query language of the data stream is a create, drop or alter type according to the underlying detection code:
constructing and sending an exception structured query language to the database if the structured query language of the data stream is of the create, drop or alter type, and
returning error information to the application program according to the received exception structured query language, and stopping writing the data stream into the database according to the error information.

Optionally, the acquiring the original request of the application program and initiating a replay request through active IAST so that the application program responds to the replay request includes following steps:
constructing, by the active IAST, the replay request based on the original request and sending the replay request to the application program; and
receiving, by the application program, the replay request and forming the data stream.

Optionally, the detecting whether the type of the structured query language of the data stream is the create, drop or alter type includes following steps:
judging whether the replay request is a replay request of the active IAST according to a header tag of the replay request; and parsing the data stream and acquiring the structured query language of the data stream if the replay request is the replay request of the active IAST or stopping the execution program of the underlying detection code if the replay request is not the replay request of the active IAST; and
judging whether the structured query language is of the create, drop or alter type according to a buffer data result of the structured query language; and constructing the exception structured query language if the structured query language is of the create, drop or alter type or stopping the execution of the underlying detection code if the structured query language is not of the create, drop or alter type.

Optionally, the constructing the exception structured query language includes following steps:
acquiring all digit values of the data stream corresponding to the structured query language of the create, drop or alter type, and altering one or more of the digit values to obtain the exception structured query language.

Optionally, the buffer data result is obtained when the structured query language is transmitted to the database and converted into a buffer type.

Optionally, obtaining the error information includes following steps:
acquiring syntax of the exception structured query language and defining it as error syntax; and
loading the error syntax into a return information to get the error information.

A system for intercepting dirty data includes a request unit, an acquisition unit, an editing unit, a detection unit, a feedback unit and an interception unit.
the request unit is configured for the active IAST to initiate a replay request when an application program starts vulnerability detection:
the acquisition unit is configured for acquiring an underlying code for communication between the application program and a database, an original request of the application program, a structured query language of a data stream and syntax of an exception structured query language;
the editing unit is configured for editing a detection logic code and coding the detection logic code into an underlying code;
the detection unit is configured for detecting whether a type of a structured query language of the data stream is a create, drop or alter type;
the feedback unit is configured for returning error information to the application program; and
the interception unit is configured for stopping the data stream containing the dirty data from being written into the database.

Optionally, the editing unit is further configured for altering one or more of digit values of the data stream corresponding to the structured query language of the create, drop or alter type.

Optionally, the system further includes a processor and a storage medium. The system stored in the storage medium executes the method for intercepting the dirty data described in any one of the above.

A computer readable storage medium storing a computer program which, when executed by a processor, executes the method for intercepting the dirty data described in any one of the above.

Compared with the prior art, the technical schemes provided in the disclosure have the following beneficial effects:

The underlying detection code is obtained by coding the detection logic code into the underlying code for communication between the application program and the database, so that when the application program receives the replay request, the replay request can be examined and meanwhile it can be judged whether there is dirty data in the data stream by further detecting the type of the structured query language, and when it is detected that there is dirty data, it can feed back the error information to the application program by altering the structured query language and constructing the exception structured query language, and based on this error information, the data stream containing dirty data can be intercepted from being written into the database. Compared with directly throwing of exception information containing the dirty data without constructing the exception structured language in prior art, the error information obtained by constructing the exception structured query language does not affect a normal connection between application program and the database.

BRIEF DESCRIPTION OF THE DRAWINGS

In order to explain the embodiments of the present disclosure or the technical scheme in the prior art more clearly, the drawings required in the description of the embodiments or the prior art will be briefly introduced below; obviously, the drawings in the following description are only some embodiments of the present disclosure, and other drawings can be obtained according to these drawings by those of ordinary skill in the art without paying creative labor.

DETAILED DESCRIPTION

Figure 1:
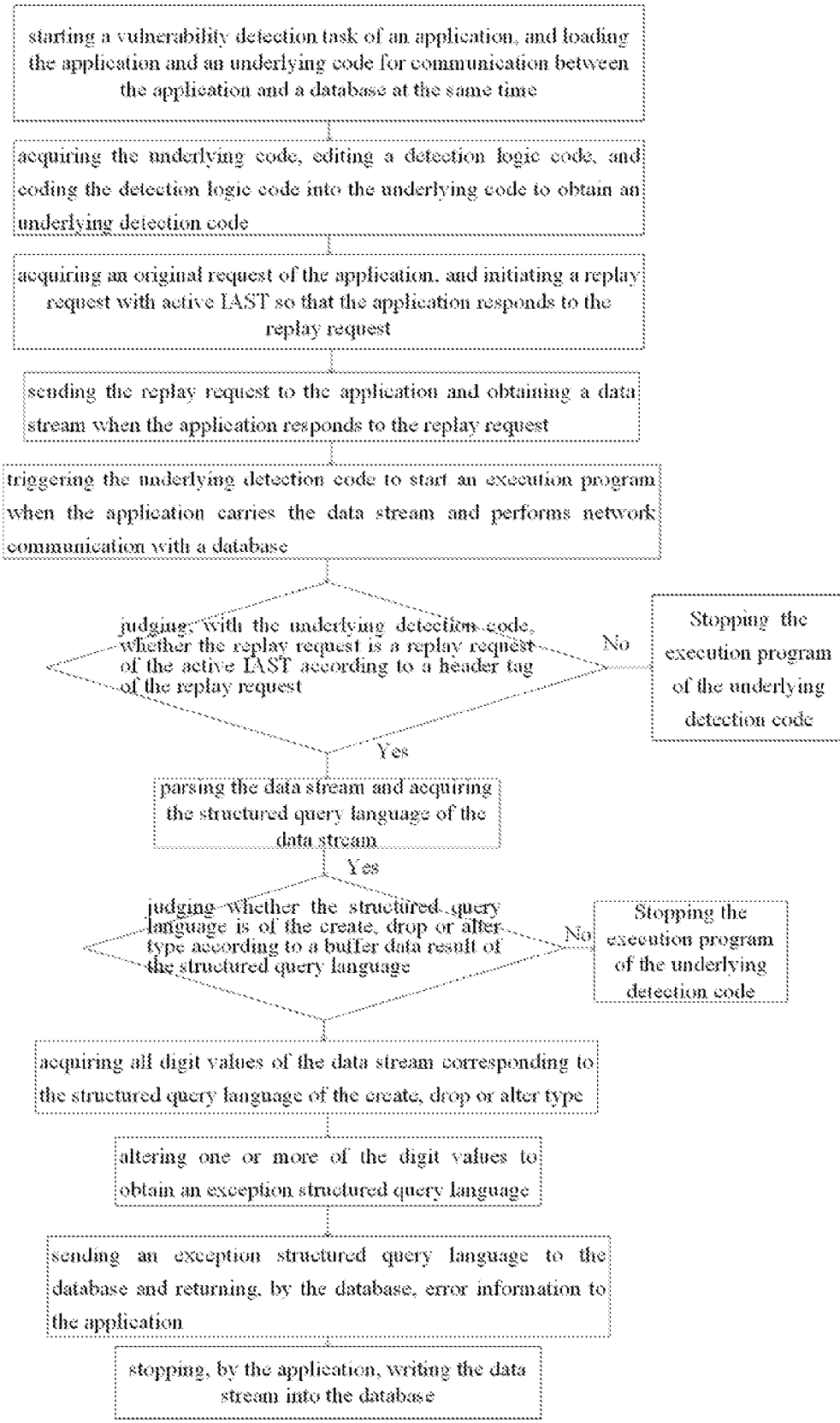
FIG. 1 is a flowchart of a method and system for intercepting dirty data according to an embodiment of the present disclosure.

The present disclosure will be further described in detail with reference to the following examples which present explanation the present disclosure and the present disclosure is not limited to the following examples.

As shown in FIG. 1, a method for intercepting dirty data includes the following steps: starting a vulnerability detection task of an application program, and loading the application program and an underlying code for communication between the application program and a database at the same time; and acquiring the underlying code, editing a detection logic code, and coding the detection logic code into the underlying code to obtain an underlying detection code.

As far as java language is concerned, taking java-application name. jar as an example for starting of a normal application program, since active IAST needs to be implemented with ajar package of an agent, if the application program is examined in vulnerability, a startup command needs to be altered into java-javaagent: agent.jar-application name. jar. Therefore, the detection logic code described in this embodiment needs to be coded into the agent. Specifically, when the vulnerability detection task of the application program is started, the application program will be loaded, and the underlying code for communication between the application program and the database will also be loaded; and during the loading, the agent will find the underlying code and insert the detection logic code into it, thus completing the coding of the underlying detection code when the application program is started.

The application program needs to be detected in vulnerability, and at the same time, when the application program starts, a new runtime bytecode instrumentation rule needs to be added so as to monitor execution of key codes, for example, a socket underlying function is added. Taking Java as an example, a function that needs to be instrumented is java.net.SocketOutputStream.write, and this write method is a function that is required for the java to communicate with the outside.

The acquiring the original request of the application program and initiating a replay request through active IAST so that the application program responds to the replay request includes following steps: constructing, by the active IAST, the replay request based on the original request and sending the replay request to the application program; and receiving, by the application program, the replay request and forming the data stream.

The original request is generated from a user's sending to the application program. When the application program receives the original request, the active IAST constructs the replay request based on the original request, and when the application program receives the replay request, it will trigger a logic of executing the structured query language, then calling a java.net.SocketOutputStream.write method; and at this time, the data stream in responding to the replay request by the application program is acquired, and the application program carries the data stream and performs network communication with the database, and triggers the underlying detection code to start an execution program.

The detecting whether the type of the structured query language of the data stream is the create, drop or alter type according to the underlying detection code includes following steps: judging whether the replay request is a replay request of the active IAST according to a header tag of the replay request, and parsing the data stream and acquiring the structured query language of the data stream if the replay request is the replay request of the active IAST or stopping the execution program of the underlying detection code if the replay request is not the replay request of the active IAST.

The replay request constructed by the active IAST based on the original request will be marked specifically on a basis of the original request, that is, a specific header tag is added to the original request for the replay request, and it is determined whether the replay request is the replay request of the active IAST by examining whether it contains the specific header tag. If the replay request is the replay request of the active IAST, it means that the data stream may produce the dirty data and if the replay request is not the replay request of the active IAST, it will not be detected for the dirty data. The specific header tag can be written as reply: moresec-reply, while a normal request of the application program will not carry a header tag containing moresec. Here, only an example is given, and in practical applications, an operator can make a judgment by setting a different unique header tag.

After analyzing the data stream and acquiring the structured query language of the data stream, it is judged whether the type of the structured query language of the data stream is the create, drop or alter type according to a buffer data result of the structured query language. If the type of the structured query language of the data stream is the create, drop or alter type, an exception structured query language is constructed; and if the type of the structured query language of the data stream is not the create, drop or alter type, the execution program of the underlying detection code is stopped. The buffer data result is obtained when the structured query language is transmitted to the database and converted into a buffer type.

When the structured query language is transmitted to the database, it will be converted into the buffer type, and the whole buffer has specific data results, and can be used to identify the structured query language, so as to judge whether a statement is a structured query language of the create, drop or alter type. If it is judged as the structured query language of the create, drop or alter type, it means that the dirty data is generated in the data stream; and if it is not the structured query language of the create, drop or alter type, the dirty data is not generated, so it is unnecessary to intercept dirty data, thus stopping execution of the underlying detection code.

The constructing the exception structured query language when the structured query language of the data stream is of the create, drop or alter type includes following steps: acquiring all digit values of the data stream corresponding to the structured query language of the create, drop or alter type, and altering one or more of the digit values to obtain the exception structured query language.

Taking java as an example, a first parameter of the java.net.SocketOutputStream.write method is a binary data stream b[ ], which contains a sentence length of the structured query language, a decimal ASCII code of the sentence, etc. For example, b[ ] can be b[46, 0, 0, 3, 0, 1, 7, 78, 83, 69, 82, 84 . . . ] or b[46, 0, 0, 3, 73, 78, 83, 69, 82, 84 . . . ], where 73, 78, 83, 69, 82, 84 are the decimal ASCII codes of the statements of the corresponding structured query language, and are insert. At this time, the exception structured query language can be obtained by altering a certain digit value corresponding to the structured query language, so that the sentence of the structured query language can be altered into a wrong insert, for example, b[7] is altered to be 90.

In sending the exception structured query language to the database, returning the error information to the application program according to the received exception structured query language, and stopping writing the data stream into the database according to the error information, obtaining the error information includes following steps: acquiring syntax of the exception structured query language and defining it as error syntax; and loading the error syntax into a return information to get the error information.

In an existing scheme, the detected exception information containing the dirty data is directly thrown out, which causes the database to construct a database connection exception, thus causing a connection with the database to be closed and affecting communications between other requests and the database. However, the error information finally obtained by constructing the exception structured query language is fed back to the application program with a syntax error, and the data stream containing the dirty data is stop from being written into the database without affecting the communication connection between other requests and the database.

A system for intercepting dirty data includes a request unit, an acquisition unit, an editing unit, a detection unit, a feedback unit and an interception unit. The request unit is configured for the active IAST to initiate a replay request when an application program starts vulnerability detection. The acquisition unit is configured for acquiring an underlying code for communication between the application program and a database, an original request of the application program, a structured query language of a data stream and syntax of an exception structured query language. The editing unit is configured for editing a detection logic code and coding the detection logic code into an underlying code. The detection unit is configured for detecting whether a type of a structured query language of the data stream is a create, drop or alter type. The feedback unit is configured for returning error information to the application program. The interception unit is configured for stopping the data stream containing the dirty data from being written into the database.

The editing unit is further configured for altering one or more of digit values of the data stream corresponding to the structured query language of the create, drop or alter type. The system for intercepting the dirty data further includes a processor and a storage medium; and the system stored in the storage medium executes the method for intercepting the dirty data described in any one of the above.

A computer readable storage medium storing a computer program which, when executed by a processor, executes the method for intercepting the dirty data described in any one of the above.

More specific examples of the computer-readable storage media may include, but are not limited to, electrical connections with one or more wire segments, portable computer disks, hard disks, random access memories (RAM), read-only memories (ROM), erasable programmable read-only memories (EPROM or flash memories), optical fibers, portable compact disk read-only memories (CD-ROMs), optical storage devices, magnetic storage devices, or any suitable combination of the above.

In this application, the computer-readable storage medium can be any tangible medium containing or storing a program, which can be used by or in combination with an instruction execution system, apparatus or device. In this application, the computer-readable signal medium may include a data signal propagated in baseband or as a part of a carrier wave in which the computer-readable program code is carried. This propagated data signal can take various forms, including but not limited to an electromagnetic signal, an optical signal or any suitable combination of the above. A computer-readable signal medium can also be any computer-readable medium other than a computer-readable storage medium, which can send, propagate or transmit a program for use by or in connection with an instruction execution system, apparatus or device. The program code contained in the computer readable medium can be transmitted with any suitable medium, including but not limited to a wireless segment, an electric wire segment, a fiber optic cable, RF, etc., or any suitable combination of the above.

In several embodiments provided in this application, it should be understood that the disclosed apparatus and method can be implemented in other ways. For example, the device embodiment described above is only exemplary, for example, division of a block, module or unit is only a logical function division, and there may be another division mode in actual implementation, for example, a plurality of units, modules or components may be combined or integrated into another device, or some of the features may be ignored or not executed.

The units may or may not be physically separated, and a component displayed as a unit may be one physical unit or multiple physical units, that is, they may be located in one position or distributed to multiple different positions. Some or all of the units can be selected according to actual needs to achieve purposes of this embodiment.

In addition, respective functional units in respective embodiments of the present disclosure may be integrated into one processing unit, or respective units may physically separately exist, or two or more units may be integrated into one unit. The above integrated unit can be implemented in a form of hardware or in a form of a software functional unit.

Particularly, according to embodiments of the present disclosure, the process described above with reference to the flowchart may be implemented as a computer software program. For example, an embodiment of the present disclosure includes a computer program product including a computer program carried on a computer readable medium, and the computer program contains program code for executing the method shown in the flowchart. In such an embodiment, the computer program can be downloaded and installed from the network through a communication part, and/or installed from a removable medium. When the computer program is executed by a central processing unit (CPU), the above functions defined in the method of the present application are performed. It should be noted that the above-mentioned computer-readable medium in this application can be a computer-readable signal medium or a computer-readable storage medium or any combination of the above two. The computer-readable storage medium can be, for example, but not limited to, an electronic, magnetic, optical, electromagnetic, infrared, or semiconductor system, apparatus, or device, or any combination of the above.

The flowcharts and block diagrams in the drawings illustrate the architecture, functions and operations of possible implementations of systems, methods and computer program products according to various embodiments of the present invention. In this regard, each block in the flowchart or block diagram may represent a module, a program segment or a part of code containing one or more executable instructions for implementing specified logical functions. It should also be noted that in some alternative implementations, the functions noted in the blocks may also occur in a different order from that noted in the drawings. For example, two blocks in succession may actually be executed in substantially parallel, or they may sometimes be executed in a reverse order, depending on the functions involved. It should also be noted that each block in the block diagrams and/or flowcharts, along with combinations of blocks in the block diagrams and/or flowcharts, can be implemented with dedicated hardware-based systems that perform specified functions or operations, or can be implemented with combinations of dedicated hardware and computer instructions.

The above is only specific embodiments of the present disclosure, but the protection scope of the present disclosure is not limited to this, and any change or substitution within the technical scope disclosed by the present disclosure should be encompassed within the protection scope of the present disclosure. Therefore, the protection scope of the present disclosure shall be subject to the protection scope of the claims.

What is claimed is:

1. A method for intercepting dirty data, comprising the following steps:
    starting a vulnerability detection task of an application program, and at the same time loading the application program and an underlying code for communication between the application program and a database;
    acquiring the underlying code, editing a detection logic code, and coding the detection logic code into the underlying code to obtain an underlying detection code;
    acquiring an original request of the application program, and initiating a replay request with active Interactive Application Security Testing (IAST) so that the application program responds to the replay request;
    acquiring a data stream in responding to the replay request by the application program so that the application program carries the data stream and performs network communication with the database, and triggering the underlying detection code to start an execution program;
    detecting whether a type of a structured query language of the data stream is a create, drop or alter type according to the underlying detection code;
    constructing and sending an exception structured query language to the database if the structured query language of the data stream is of the create, drop or alter type, and
    returning error information to the application program according to the received exception structured query language, and stopping writing the data stream into the database according to the error information, wherein the error information obtained by constructing the exception structured query language does not affect a normal connection between the application program and the database;
    wherein the detecting whether the type of the structured query language of the data stream is
    the create, drop or alter type comprises the following steps:
    judging whether the replay request is a replay request of the active interactive application security testing according to a header tag of the replay request; and parsing the data stream and acquiring the structured query language of the data stream if the replay request is the replay request of the active interactive application security testing or stopping the execution program of the underlying detection code if the replay request is not the replay request of the active interactive application security testing, wherein the replay request constructed by the active interactive application security testing based on the original request will be marked specifically on a basis of the original request, that is, a specific header tag is added to the original request for the replay request; and judging whether the structured query language is of the create, drop or alter type according to a buffer data result of the structured query language; and constructing the exception structured query language if the structured query language is of the create, drop or alter type or stopping the execution of the underlying detection code if the structured query language is not of the create, drop or alter type; wherein the buffer data result is obtained when the structured query language is transmitted to the database and converted into a buffer type, the whole buffer has specific data results that can be used to identify the structured query language, so as to judge whether a statement is a structured query language of the create, drop or alter type;

wherein the constructing the exception structured query language comprises the following steps:

acquiring all digit values of the data stream corresponding to the structured query language of the create, drop or alter type, and altering one or more of the digit values to obtain the exception structured query language;

wherein obtaining the error information comprises the following steps:

acquiring syntax of the exception structured query language and defining it as error syntax; and loading the error syntax into a return information to get the error information.

2. The method for intercepting the dirty data according to claim 1, wherein the acquiring the original request of the application program and initiating a replay request through active IAST so that the application program responds to the replay request comprises the following steps:

constructing, by the active IAST, the replay request based on the original request and sending the replay request to the application program; and receiving, by the application program, the replay request and forming the data stream.

3. A non-transitory computer readable storage medium storing a computer program which, when executed by a processor, executes the method for intercepting the dirty data according to claim 1.

* * * * *